Aug. 24, 1926.
S. GODDARD
1,597,150
ADJUSTABLE CHAIN CONNECTER
Filed July 8, 1925
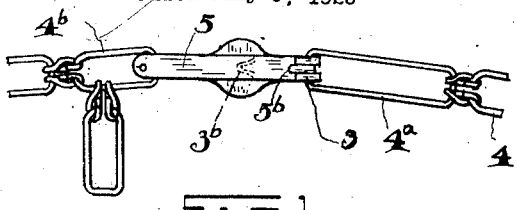
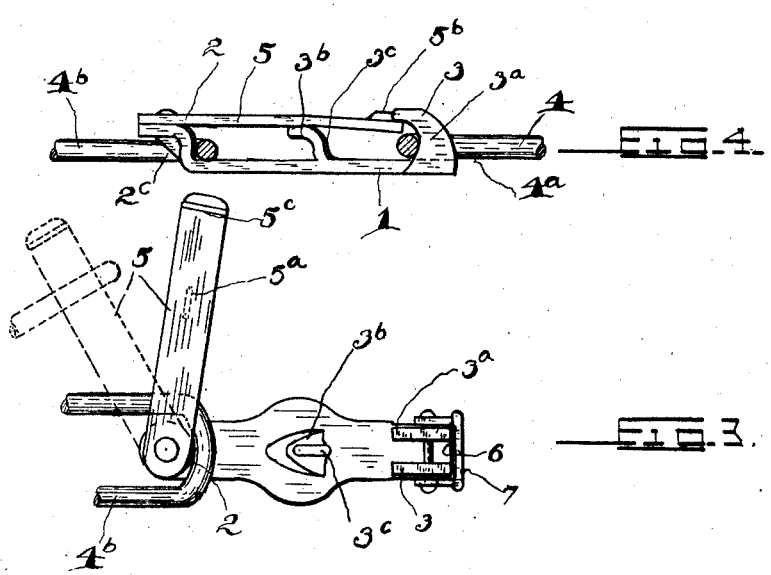
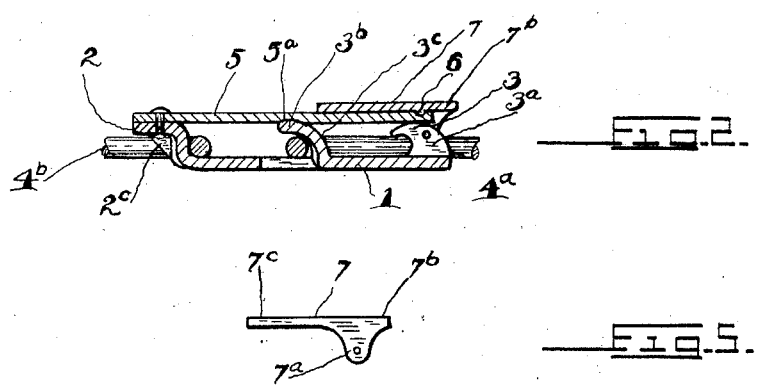
INVENTOR
S. Goddard
BY J. Edward Maybee
ATTY Patented Aug. 24, 1926.

1,597,150

UNITED STATES PATENT OFFICE.

STEWART GODDARD, OF TORONTO, ONTARIO, CANADA.

ADJUSTABLE CHAIN CONNECTER.

Application filed July 8, 1925. Serial No. 42,229.

This invention relates to adjustable chain connecters and more particularly to those employed for detachably connecting the ends of a side chain for an anti-skid device. Heretofore it has been the common practice to employ a lever for bringing the ends of the chain towards one another and then locking the lever to lock the chain ends. This type of lever swings in a plane normal to the side of the tire so that it swings the end link of the chain away from the tire and in front of its projection which results in the chain being drawn past its projection and then slackened off to engage the latter. My object is to provide a chain connecter which will overcome the above objectionable feature and which is simple in design and easily operated. Other objects I have in mind will hereinafter appear.

I attain my objects by means of the constructions hereinafter described and illustrated in the accompanying drawings in which—

Fig. 1 is a side elevation of part of a side chain showing my improved connecter in position thereon;

Fig. 2 is a longitudinal section of the preferred form of my device on an enlarged scale;

Fig. 3 a plan view of the same illustrating the manner in which the link slides down the lever; and Fig. 4 a side view of a modified form of my connecter.

Fig. 5 is a detail of the latch mechanism.

1 is the body of the connecter which is preferably formed of a sheet metal stamping. One end of the body is bent upwardly as shown to form a projection 2. A projection 3 is formed, at the other end of the body, by bending up the hook shaped flanges 3ª formed integral with the opposite sides of the body 1. Intermediate the ends of the body a projection 3ᵇ is formed by cutting the former and stamping up the material. The projections 2 and 3ᵇ are provided with strengthening ribs 2ᶜ and 3ᶜ respectively. Either one of the projections 3 or 3ᵇ may be used for engaging one end 4ª of a side chain 4 of an anti-skid chain or device. The other end 4ᵇ of this chain is carried by means of a lever 5 into engagement with the projection 2.

The lever 5 is pivoted on the projection 2 to swing laterally of the body 1 and in substantially the same plane as the chain. The link 4ᵇ is passed over the lever 5 and the latter is swung towards the projections 3 to tighten the chain which results in the link sliding down the lever, into engagement with the projection 2, immediately the free end of the lever passes its fulcrum point. To facilitate this slide engaging movement the link engaging sides of the lever are substantially straight and the widths of the projection 2 and the fulcrumed end of the lever are substantially the same. With this construction the link engaging the lever is not swung past its projection or hook and then permitted to slide back into engagement with the latter as in the connecters heretofore known.

The underside of the lever is provided with an indentation 5ª adapted to snap over the upper end of the projection 3ᵇ which releasably locks the lever in position to prevent the accidental release of the chain links. To ensure the lever being locked the end thereof is provided with a transverse groove or indentation 5ᶜ adapted to receive a projection 6 formed in a latch 7 which is pivoted on the flanges 3ª. The sides 7ª of the latch are adapted to engage the sides of the lever to prevent lateral displacement of the later and the projection 6 is adapted to snap into the groove 5ᶜ to releasably retain the latch in its locking position. The latch may be provided with rearwardly and forwardly directed projections 7ᵇ and 7ᶜ either one of which may be used to swing the latch to its inoperative position.

The projections 3 and 3ᵇ are spaced apart a distance equal to half the length of the chain links and any link adjacent the end 4ᵇ may be used for engagement with the lever 5 and projection 2. This enables the chain to be adjusted to within a half link of the desired length used.

In Fig. 4 is shown a modification of the means for releasably locking the free end of the lever which is displaced to form a rib 5ᵇ adapted, when the free end of the lever is bent inwardly under the ends of the hook, to engage the inner sides of the hook projections 3. These sides form shoulders adapted to prevent lateral movement of the lever. To remove the links the free end of the lever is pressed downwardly until the rib 5ᵇ clears the projections 3 and the lever is then swung to clear the projections.

What I claim is:

1. A chain connecter including a body connected with one end of a chain, the body having a projection adjacent one end thereof for engaging the other end of the chain; and a lever pivoted on the projection to swing laterally of the body and adapted to pass through a link adjacent the last mentioned chain end, the lever having its link engaging side substantially straight whereby the link will readily slide down the lever and over the projection during the movement of the lever towards its closed position, the pull of the chain when in use being exerted solely against the projection.

2. A chain connecter including a body connected with one end of a chain, the body having a projection adjacent one end thereof for engaging the other end of the chain, the projection having a rounded shoulder for engagement with the link; and a lever pivoted on the projection to swing laterally of the body and adapted to pass through a link adjacent the last mentioned chain end, the lever having a rounded end adjacent the shoulder of substantially the same diameter as the shoulder and having its link engaging side substantially straight and tangent to the said lever end whereby the link will readily slide down the lever and over the projection during the movement of the lever towards its closed position, the pull of the chain when in use being exerted solely against the projection.

3. A chain connecter including a body having a projection at each end and one intermediate the ends; a lever pivoted on an end projection to swing laterally of the body and adapted to engage the outer end of the intermediate projection, the free end of the lever being provided with an indentation; and a latch provided with side flanges pivoted on the body and having a projection adapted to snap into the said indentation, the side flanges being adapted to engage the lever to prevent its lateral displacement.

4. A chain connecter including a body connected with one end of a chain, the body having a projection adjacent one end thereof for engaging the other end of the chain; a lever pivoted on the projection to swing laterally of the body and adapted to pass through a link adjacent the last mentioned chain end, the lever having its link engaging side substantially straight whereby the link will readily slide down the lever and over the projection during the movement of the lever towards its closed position, the pull of the chain when in use being exerted solely against the projection; and a latch provided with side flanges pivoted in the body, the said flanges being adapted to engage the lever to prevent its lateral displacement.

Signed at Toronto this 3rd day of July, 1925.

STEWART GODDARD.